United States Patent [19]

Frese

[11] 3,967,244

[45] June 29, 1976

[54] APPARATUS FOR THE WIRELESS TRANSMISSION OF A CONTROL SIGNAL TO THE CONTROL PATH OF A CONTROLLED SEMICONDUCTOR VALVE

[75] Inventor: Stefan Frese, Vienna, Austria

[73] Assignee: Siemens Aktiengesellschaft, Munich, Germany

[22] Filed: June 5, 1975

[21] Appl. No.: 584,009

[30] Foreign Application Priority Data
June 10, 1974 Germany............................ 2427951

[52] U.S. Cl. ............................ 340/171 PF; 325/23; 325/37
[51] Int. Cl.² ......................................... H04B 1/00
[58] Field of Search .................. 325/30, 37, 39, 40, 325/48, 59, 47, 60, 163, 320, 390, 392, 23, 24; 178/66 R, 66 A; 340/171 A, 171 PF, 185; 343/225

[56] References Cited
UNITED STATES PATENTS

| | | |
|---|---|---|
| 3,160,812 | 12/1964 | Scantlin ............................. 325/39 |
| 3,521,267 | 7/1970 | Lester et al.......................... 325/37 |
| 3,522,536 | 8/1970 | Reynolds ............................. 325/37 |
| 3,638,174 | 1/1972 | Haase et al. ......................... 325/37 |
| 3,699,444 | 10/1972 | Ghose .................................. 325/23 |
| 3,747,108 | 7/1973 | Ringer .................................. 325/37 |
| 3,835,454 | 9/1974 | Palmieri et al........................ 325/30 |

Primary Examiner—Marshall M. Curtis
Attorney, Agent, or Firm—Kenyon & Kenyon Reilly Carr & Chapin

[57] ABSTRACT

A circuit arrangement for the wireless transmission of a control signal to the control path of a semiconductor valve. In particular, the circuit arrangement is provided with a separating filter which is connected to a remote-indication receiver and which is arranged between the high-frequency transmitter and the transmitting antenna of the circuit arrangement. Specifically, the filter includes two directional couplers which are separated by a distance equal to one-eighth of the wavelength of the carrier frequency transmitted by the high frequency transmitter.

2 Claims, 1 Drawing Figure

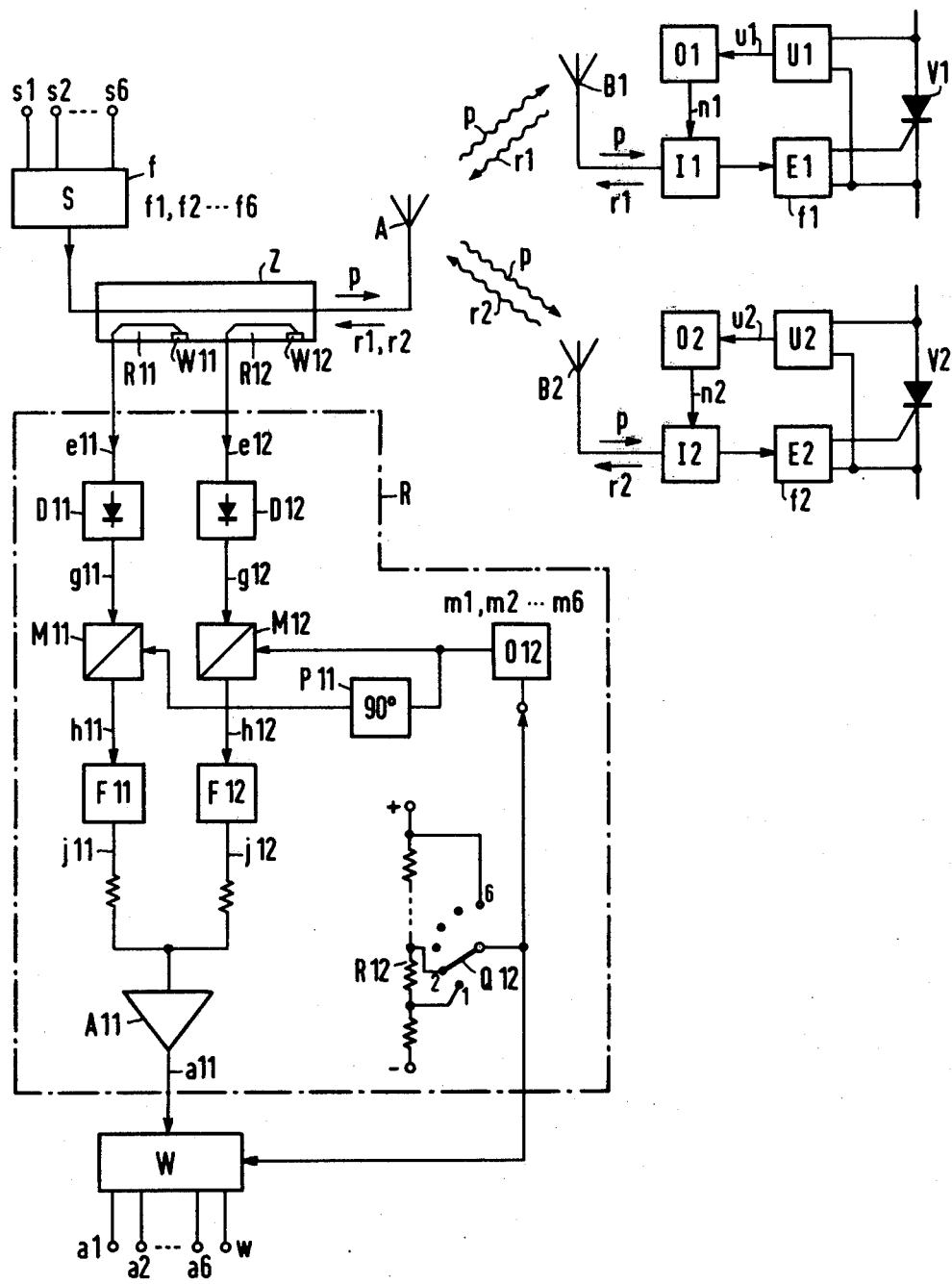

3,967,244

APPARATUS FOR THE WIRELESS TRANSMISSION OF A CONTROL SIGNAL TO THE CONTROL PATH OF A CONTROLLED SEMICONDUCTOR VALVE

BACKGROUND OF THE INVENTION

1. Field of the Invention

The invention concerns apparatus for the wireless transmission of a control signal to the control path of a controlled semiconductor valve.

2. Description of the Prior Art

In a known apparatus of the above-type, at the transmitter location of the apparatus, the control signal and a carrier frequency are fed to a modulator which develops a frequency-modulated output signal. A transmitting antenna, coupled to the modulator output, then radiates the frequency modulated output signal via a radio wave which propagates over a radio transmission path. Along the transmission path, at the receiver location of the apparatus, a receiver antenna receives the propagating frequency modulated signal and couples it to a demodulator. The demodulated output is then conveyed to the control path of the semiconductor controllable valve for exercising control thereover.

Also located at the receiver location of the apparatus is an indicating means for developing a signal indicative of the state of the controllable valve. This indicating means comprises an indicating transmitter and a modulator and its output signal is coupled to the receiver antenna and retransmitted as a back reporting or remote-indication signal.

The aforesaid remote-indication signal, once propagated, passes back over the transmission path and is received by the transmitter antenna. From the latter, it is coupled into a modulation dependent signal filter which is arranged between the transmitter antenna and the transmitter modulator. The filter output, in turn, is cupled to a remote indication receiver which separates therefrom the information therein indicative of the state of the controlled valve.

It is an object of the present invention to provide a modulation-dependent signal filter for the above-described apparatus which can be readily manufactured and which provides good signal selectivity.

SUMMARY OF THE INVENTION

In accordance with the principles of the present invention, the above and other objectives are realized by employing in the above-described apparatus, an amplitude modulated signal, as the remote indication signal and, in addition, by employing a modulation-dependent signal filter which comprises first and second direction couplers which are arranged one behind the other and between the transmitter modulator and transmitter antenna. In particular, the two directional couplers are arranged so as to be physically displaced by one eighth of the wavelength of the carrier frequency applied to the transmitter modulator. Specifically, the directional couplers have their main lines connected together and their branch lines connected to the remote indication receiver of the apparatus.

In further accord with the invention the aforesaid remote indication receiver comprises first and second AM demodulators, which are coupled to the first and second directional couplers respectively. The outputs of these AM demodulators, in turn, are connected to the respective first inputs of first and second mixer stages, respectively. The first mixer is additionally fed at its second input a cosine signal of predetermined local frequency, while the second mixer is fed at its second input by a sine signal of the same predetermined local frequency. The two mixer stages, in turn, are followed by respective lowpass filters whose outputs serve as the first and second imputs of an adding member. The output of the latter member is then applied to the evaluator circuit of the apparatus.

As can be appreciated, with the present invention, the employment of an amplitude modulated signal as the remote-indication signal, largely prevents supression of the latter signal by the frequency modulated transmitted signal. Additionally, with the present invention, adjustment of the distance between the transmitting and receiving antennas for a maximum amplitude of the remote-indication signal is no longer necessary.

In one particularly advantageous embodiment of the invention, an oscillator operating at the predetermined local frequency is connected directly to the second input of the second mixer stage and is connected through a 90° phase-shifter to the second input of the first mixer stage. This eliminates the need for two separate oscillators whose frequency and phase would have to be adjusted to each other.

Moreover, in order to be able to change the local frequency, the aforesaid oscillator is advantageously tuned stepwise. In particular, different steps of a control voltage are provided to the frequency control input of the oscillator by using a switch to pick off different voltages from a potentiometer.

BRIEF DESCRIPTION OF THE DRAWING

The above and other aspects and features of the present invention will become more apparent upon reading the following detailed description which makes reference to the accompanying drawing, in which:

FIG. 1 shows apparatus in accordance with the principles of the present invention.

DETAILED DESCRIPTION

As shown in FIG. 1, the present apparatus comprises a control transmitter S to which is applied, via an input terminal, a control signal $s1$ of, for instance, 50 Hz. The signal $s1$ is applied to the transmitter S for controlling the triggering of a semiconductor valve V1. The latter valve, typically might be a thyristor and is assumed herein to have the identification number 1. As can be appreciated, instead of just the valve V1, the signal $s1$ could also be used to control several series or parallel-connected semiconductor valves which must be triggered simultaneously.

The control transmitter S is also fed, via another input terminal, a second control signal $s2$ which is at a frequency of 50 Hz and which is used to control the triggering of a second semiconductor valve V2 having an identification number 2. As in the case of the signal $s1$, instead of just one valve, the signal $s2$ could also be used to control the simultaneous triggering of several series or parallel-connected valves.

It is assumed herein that the two semiconductor valves V1, V2 are valves included in the same high voltage converter, e.g., the same converter for a high-voltage d-c transmission system, but that they are arranged in different branches of the converter and are to be triggered at different times. To accomplish such firing, the control signal $s2$ is phase-shifted relative to the control signal s1, for instance, by 60°. Additional control signals s4 to s6, of which only s6 is specifically shown, are also applied to the transmitter S for controlling the sequential triggering of additional semiconductor valves not specifically illustrated.

The control transmitter S develops an output transmitted signal p which is coupled through a signal filter Z to a transmitting antenna A. The transmitter signal p is a frequency-modulated signal having a carrier frequency f which is modulaated in the rhythmn of the control signals s1, s2. The latter two signals, in turn, are associated with distinctly different subcarrier frequencies f1 and f2, respectively, each of which, for instance, is in the range from 6.7 to 11 MHz. The carrier frequency f of the singal p, on the other hand, is, for instance, in the GHz range and might, for example, be equal to 2.450 GHz.

The transmitted signal p is propagated via radio waves to a number of receiving antennas B1, B2, . . . , of which only the two receiving antennas B1, B2 are specifically shown. Such transmission of the signal p to the receiving antennas B1, B2 is indicated in the FIG-URE by the wavy arrows. As can be seen, the receiving antennas B1, B2 are placed at some distance from the transmitting antenna A. This distance is, in general, determined by the safety distance which must be observed at the highest voltage of the converter for protection of its semiconductor valves. As above-noted, only two receiving antennas B1 and B2 have been specifically shown in FIG. 1. However, as can be appreciated, a receiving antenna will, in general, be provided for each of the semiconductor valves of the converter.

The receiving antennas B1 and B2 are coupled to respective receivers E1 and E2 whose outputs control, respectively, operation of the semiconductor valves V1 and V2. More specifically, the individual receivers E1 and E2 are of the same construction and each comprises a demodulator. Each receiver, moreover, has the property that it selects from a multiplicity of received control signals, the control signal s1 or s2 assigned to it and it transmits, as a function of its respective control signal, a firing signal to the control path of its associated semiconductor valve.

Controllable impedance members I1 and I2, respectively, are arranged between the receiving antenna B1 and the receiver E2. The members I1 ad I2, might, typically, be varactors or PIN diodes and as can be seen, their impedances are modulated by the output identification frequencies n1 and n2 of identification frequency oscillator O1 and O2, respectively. The identification frequencies n1 and n2 are characteristic of the respective semiconductor valve V1 or V2, the identification frequency n1 being assigned to the semiconductor valve V1 and the identification frequency n2 to the semiconductor valve V2. The frequencies n1 and n2 are different from each other and may be separated, for instance, by 1 kHz or 10 kHz. The frequency n1 might be, for instance, 1.100 MHz.

The transmitted signal p received by the receiving antennas B1, B2 is coupled, via the impedance members I1, I2 to the receivers E1, E2 and is demodulated therein. In particular, each receiver ascertains whether the demodulated signal is actually intended for triggering its respective valve and, if so, permits such triggering.

The identification frequency oscillators O1 and O2 are provided for reporting back information regarding the state of their respective semiconductor viavles V1 and V2. To ascertain the state of the semiconductor valves V1 and V2, voltage monitoring circuits U1 and U2, respectively, are provided, for measuring the anode-cathode voltages of the valves. If the anode-cathode voltage being measured is zero, i.e., if there is a disturbance, the respective monitoring circuit U1 or U2 measuring the voltage delivers as its output signal u1 or u2 a blocking signal to the identification frequency oscillator O1 or O2. This blocking signal blocks the respective output voltage of the identification frequencies oscillator, i.e., reduces output outtput voltage zero.

In the undisturbed case, a reverse voltage exists at each of the semiconductor valves V1 and V2 and, hence, each voltage monitoring circuit U1, U2 delivers no blocking signal. As a result, in the undisturbed case the identification frequency oscillators cause their associated impedance members I1, I2 to change in value in accordance with the identification frequencies n1, n2. The transmitter signal p arriving at each of the impedances I1, I2 is thereby modulated and caused to be partially reflected. The resultant reflected signals are then reradiated, via the receiving antennas B1, B2 as amplitude-modulated backreporting signals r1, r2. These reradiated amplitude-modulated signals travel back over the transmission path and are received by transmitting antenna A.

It should be pointed out that, since different types of modulation are provided for the transmitted signal p and the mixture of reradiated signals r1, r2, they do not influence each other. This assures interference-free triggering of the semiconductor valves V1, V2 and interference-free remote indication.

The mixture of the remote indication signals r1, r2 received by the transmitting antenna A is fed, via the signal filter Z, to a remote-indication receiver R in the form of two receiver signals e11, e12. The remote indication receiver R selects the remote-indication signals r1, r2 according to their identification frequencies n1, n2. If one of the semiconductor valves V1, V2 is disturbed, the corresponding identification frequency n1 or n2 is missing in the received signals e11, e12.

An evaluator circuit W processes the signals delivered by the remote-indication receiver R further to derive information regarding the identification number, and location and/or number of defective semiconductor valves V1, V2. In particular, the evaluator circuit W generates output signals a1 and a2 associated with the valves V1, V2, which can be used to operate control lights. The evaluator circuit W also delivers a sum signal w, which can be used to trigger an alarm.

As shown in FIG. 1, the signal filter Z comprises two waveguide-type directional couplers R11, R12 which are terminated in respective termination resistors W11 and W12. In principle, commercially available coaxial directional couplers can also be used for the couplers R11 and R12, but the latter type couplers have a rather large bandwidth and are in general also more expensive. As is well known, a directional coupler comprises a main or through line and a branch line. While waves can move on the through line in both directions, the coupled wave on the branch line can move only in one direction, if the termination is reflection-free (see, for instance, "Lexikon der Hochfrequenz-, Nachrichtenund Elektrotechnik", Vol. 4, VEB Verlag Technik, Berlin, Porta Verlag KG, Munich, page 100).

The two directional couplers R11 and R12 measure the carrier wave going out from the transmitting antenna A comprising the signal p and also the waves returning to the transmitting antenna A comprising the remote-indication signals r1, r2.

In accordance with the invention, the two directional couplers R11 and R12 are arranged so as to be physically displaced relative to each other by one-eighth of the wavelength of the carrier frequency of the carrier signal p. In other words, at the common main line, the branch line of the directional coupler R11 on the transmitter side is arranged displaced relative to the branch line of the directional coupler R12 on the antenna side by one-eighth of said wavelength.

In the discussion to follow regarding the operation of the apparatus of FIG. 1, it has been assumed that the angular frequency $\Omega$ of the carrier frequency $f$ is equal to $2\pi f$. It has been also assumed, to simplify the discussion, that we have only a single semiconductor valve and, thus, that only a single remote-indication signal $r$ is produced. Additionally, it has been further assumed that the signal r is amplitude-modulated in accordance with a single indentification frequency n whose corresponding angular frequency is equal to $2\pi n$.

Having made the above assumptions, the directional coupler R11 on the transmitter side will be seen to furnish a remote-indication signal e11 which has the following form:

$$e11 = A_1 \cos\Omega t + B_1 (1 + \cos\omega t) \cos (\Omega t + \phi) \quad (1)$$

where $A_1$ and $B_1$ are constants, $t$ is time and the $\phi$ is the phase angle which characterizes the phase difference between the carrier wave radiated by the transmitting antenna A and the reflected remote-indication wave. As can be observed, the B-term, which describes the return wave, comprises a component that is reflected unmodulated and one that is reflected modulated.

Similarly, the directional coupler R12 on the antenna side furnishes a remote indication signal e12 which has the form:

$$e12 = A_1 \cos (\Omega t - 2\pi/8) + B_1 (1 + \cos\omega t) \cos (\Omega t + \phi + 2\pi/8) \quad (2)$$

In the $A_1$-part of Eq. 2 consideration has been taken for the fact that the outgoing carrier waver arrives at the directional coupler R12 at a later time than it arrives at the directional coupler R11. Likewise, in the $B_1$-part of Eq. 2, consideration has been taken for the fact that the return wave r arrives at the directional coupler R12 at earlier time than it arrives at the directional coupler R11. In Eq. (2), different signs are, therefore, shown for the phase displacements $2\pi/8$, which gives expression to the aforesaid opposite-movement behavior of the transmitted and return waves.

As shown, the branch lines of the directional couplers R11 and R12 are coupled, respectively, to first and second AM detectors or demodulators D11 and D12, both of which are included in the remote indication station R. The demodulators D11 and D12 which, typically, can be semiconductor diodes, are provided for amplitude demodulating the respective remote-indication signals e11 and e12. They, therefore, produce amplitude-demodulated output signals g11 and g12 which are independent of the angular frequency $\Omega$. The demodulators D11 and D12 also act, at the same time, as squaring members.

As can be readily shown, the magnitudes of the amplitude-demodulated output signals g11 and g12 produced by the demodulators D11 and D12 are approximately as follows:

$$g11 = 0.5 (e11)^2 = 0.5\, A_1 B_1 \cos\phi\, (1 + \cos\omega t) \quad (3)$$

and $$g12 = 0.5 (e12)^2 = 0.5\, A_1 B_1 \sin\phi\, (1 + \cos\omega t). \quad (4)$$

In each of the Eqs. 3 and 4, the $A_1^2$ term furnishes only a d-c component and, thus, has been ignored, as has been the $B_1^2$ term which is negligible relative to the $A_1 B_1$ term. Justification for the latter simplification was confirmed experimentally, since experiments performed showed that the constant $A_1$ was about 40 dB larger than $B_1$.

As can be seen from the Eqs. (3) and (4), if only one of the directional couplers, e.g., the directional coupler R11, were included in the signal filter Z, then one would have to adjust the distance from the transmitting antenna A to the receiving antennas B1, B2 so that the phase shift $\phi$ is such that the output signal g11 is at a maximum (i.e., is equal to 0.5 AB (1 +cos$\omega$t) ), the latter signal level for g11 being the most desirable signal level for the further signal processing of g11 in the evaluation circuit W. With the present apparatus, however, the including of the two directional couplers R11, R12 in the filter Z and the separating of these couplers by distance of one-eighth of the wavelength of the carrier frequency $f$ makes adjustments of the above-type completely unnecessary. In particular, by selecting the distance between the couplers R11 and R12 to be one-eighth of the wavelength of the carrier frequency $f$, the output signal g11 is made to vary as the cosine of the phase angle $\phi$, while the output signal g12 is made to vary as the sine of the phase angle $\phi$. Thus, even if the distance between the transmitting antenna A and the receiving antenna B1, B2 is now accidentally chose such that cos $\phi = 0$ and, hence, g11 = 0, interference-free signal evaluation can still take place by using the output signal g12 which is now at its maximum value $g12 = 0.5\, A_1 B_1\, (1 + \cos\omega t)$. Similarly, an effective evaluation can also take place when the distance between the aforesaid antennas is such that sin $\phi = 0$ and, thus, g12 = 0, by using the signal g11 which would, in this circumstance, be at its maximum value. It can be appreciated, therefore, that regardless of the distance between the transmitting antenna A and the receiving antenna B1, B2 and, therefore, of the phase angle $\phi$, at least one of the two output signals g11 and g12 always has a substantial amplitude, thereby making it suitable for evaluation by further processing.

As shown in FIG. 1, the output of the first AM demodulator D11 is connected to a first input of a first mixing stage M11 to whose second input a cosine signal of predetermined local frequency $m$ is applied. Similarly, the output of the second AM demodulator D12 is connected to the first input of a second mixer stage M12. The second input of the latter mixer, in turn, is acted upon by a sine signal of the same predetermined local frequency $m$. The local frequency m is selected to be below or less than the identification frequency $n$. In particular, the frequency $m$ is selected so that the difference frequency $(n - m)$ is distinctly different from the identification frequency n as well as from the local frequency $m$ itself. Typically, for an identification frequency $n = 1.100$ MHz, the local frequency $m$ may be, for instance, equal to 0.900 MHz.

Assuming that $u = 2\pi m$, it can be shown that the output signals $h11$ and $h12$ of the two mixing stages M11 and M12, which stages may be designed as multipliers followed by integration circuits, are as follows:

$$h11 = 0.5\, A_1 B_1 \cos\phi\, (1 + \cos\omega t)\, \cos ut \qquad (5)$$

and $$h12 = 0.5\, A_1 B_1 \sin\phi\, (1 + \cos\omega t)\, \sin ut. \qquad (6)$$

As shown, the sine and cosine signals delivered to the mixers M11 and M12 are derived from a sinusoidal frequency generator or oscillator O12. In particular, the sinusoidal output of the latter generator is coupled directly to the second input of the second mixer stage M12. On the other hand, the generator output is coupled to the second input of the first mixer stage M11 through a 90° phase-shifter P11.

In FIG. 1, the local frequency developed by the oscillator O12 can be varied to accommodate the use of a multiplicity of identification frequencies $n1, n2, \ldots$ instead of just the single identification frequency $n$. In particular, the frequency $m$ of the oscillator O12 can be tuned in steps, e.g., in 10 kHz steps by applying a stepwise varying control voltage to its frequency control intput. In the general case, each step of the control voltage would correspond to an identification number 1, 2 ... of one of the semiconductor valves V1, V2, ... As shown, the individual steps of the control voltage are generated by a potentiometer P12 and which is coupled to a take off switch Q12. The switch Q12 may be of electronic design and, in particular, may be automatically switchable in cycles, so that the local frequency m goes successively through all its step values $m1, m2, \ldots m6, m1, \ldots$ As can be appreciated, there will, in general, be as many steps values $m1, m2, \ldots$ as there are identification frequencies $n1, n2, \ldots$ However, if one choses the step values $m1, m2, m3 \ldots$ according to the relation $$(n1 - m1) = (n2 - m2) = (n3 - m3) = \ldots, \qquad (40)$$

then relatively few filters for filtering the mixer output signals are necessary, as all the filters need only be tuned to the difference frequency $(n - m)$.

The output of the first mixer stage M11 is connected with the first input of an adding stage A11, shown as an operational amplifier, via a first lowpass filter F11. The output of the second mixer stage M12 is, on the other hand, connected with the second input of the adding stage A11, via a second lowpass filter F12. As shown, the adding stage A11 has two input resistors, the latter resistors not being specifically enumerated in the figure.

The input signals J11 and j12 applied to the adding stage A11 from the outputs of the lowpass filters F11, F12 can be written, after appropriate transformations as follows:

$$j11 = 0.25\, A_1 B_1 \cos\phi\, \cos(\omega - u)\, t \qquad (7)$$

and $$j12 = 0.25\, A_1 B_1 \sin\phi\, \sin(\omega - u)\, t. \qquad (8)$$

It should be noted that in deriving Eqs. 7 and 8 consideration has been given to the fact that signal components of the identification frequency $n = \omega/2\pi$ and the local frequency $m = u/2\pi > (n-m)$ are not passed by the lowpass filters F11 and F12.

The summing of the two input signals a11 as follows: signals $j11, j12$ in the adding stage A11 furnishes an output signal a11

$$a11 = j11 + j12 = 0.25\, A_1 B_1 \cos((\omega - u)t - \phi). \qquad (9)$$

If desired, the adding member A11 can be followed by a filter which is sharply tuned to the difference frequency $(n - m)$ and only passes the latter.

It is noteworthy, with respect to the output signal a11, that its amplitude is completely independent of the phase angle $\phi$. The physical location of the individual receiving antennas B1, B2 with respect to the transmitting antenna A, therefore, has no effect on the magnitude of the output signal a11 and therefore, on the further evaluation in the evaluator circuit W. As a result, one now has a great deal of freedom in situating the receiving antennas B1, B2.

What is claimed is:
1. Apparatus for the wireless transmission of a control signal to the control path of a controllable semiconductor valve comprising:
 a receiving location including:
  a receiving antenna for receiving a first modulated carrier signal and for transmitting a back-reporting indication signal;
  a first demodulator responsive to said first carrier signal and having an output connected to said control path;
  and means responsive to the state of said valve for developing an amplitude modulated signal which comprises said back reporting indication signal;
 and a transmitting location including:
  means for generating a carrier signal;
  a first modulator responsive to said carrier signal and to said control signal for generating said first modulated carrier signal;
  a transmitting antenna for transmitting said first carrier signal and for receiving said back-reporting indication signal;
  first and second directional couplers which are separated by one-eighth of the wavelength of the carrier frequency of said carrier signal, each of said directional couplers having a branch line and main line, the main line of said first coupler being connected at one end of said first modulator and at the other end to one end of said main line of said second coupler, the other end of the main line of said second coupler being connected to said antenna;
  first and second AM demodulators connected to the branch lines of said first and second couplers, respectively;
  means for generating sinusoidal and cosinusoidal signals of a predetermined local frequency;
  a first mixer responsive to the output of said first AM demodulator and to said cosinusoidal signal;
  a second mixer responsive to the output of said second AM demodulator and to said sinusoidal signal;
  first and second lowpass filters connected to the outputs of said first and second mixers, respectively;
  and means for adding the outputs of said first and second filters.
2. Apparatus in accordance with claim 1 in which said means for generating includes:
  an oscillator for generating a sinusoidal signal at said local frequency;
  means for connecting said oscillator to said second mixer;
  and means including a 90° phase-shifter for connecting said oscillator to said first mixer.

* * * * *